United States Patent

Saltzberg et al.

[15] 3,662,746

[45] May 16, 1972

[54] APPARATUS FOR DETECTING, ANALYZING AND RECORDING BIOELECTRIC POTENTIALS

[72] Inventors: Bernard Saltzberg, 3702 Octavia St., New Orleans, La. 70125; Leonard S. Lustick, 3721 Rue Mignon St., New Orleans, La. 70114; Robert G. Heath, 419 Walnut St., New Orleans, La. 70118

[22] Filed: May 14, 1969

[21] Appl. No.: 824,501

[52] U.S. Cl. .................................128/2.06 R, 128/2.1 B
[51] Int. Cl. ...........................................................A61f 5/04
[58] Field of Search ..................128/2.05 A, 2.05 B, 2.05 P, 128/2.05 R, 2.05 S, 2.05 T, 2.06 A, 2.06 F, 2.06 G, 2.06 R, 2.08, 2.1 B, 2.1 R; 324/111, 94; 328/121, 150, 151, 127; 329/196, 166; 346/74; 307/238

[56] References Cited

UNITED STATES PATENTS

| | | | |
|---|---|---|---|
| 3,195,533 | 7/1965 | Fischer | 128/2.1 B |
| 2,815,748 | 12/1967 | Baucke | 128/2.05 T |
| 3,228,391 | 1/1966 | Fitter et al. | 128/2.05 T |
| 3,318,303 | 5/1967 | Hammacher | 128/2.05 S |
| 3,432,814 | 3/1969 | Bissett | 324/94 |
| 3,463,143 | 8/1969 | Karsh | 128/2.06 A |
| 3,498,287 | 3/1970 | Ertl | 128/2.1 R |

*Primary Examiner*—William E. Kamm
*Attorney*—Cushman, Darby & Cushman

[57] ABSTRACT

A means for monitoring electrophysiological activity is described having electrodes connected to an animal body with the output therefrom coupled to an amplifier which in turn feeds the amplified physiologically generated signal to a band pass filter network. The band pass filter is adapted to pass only those portions of the signals from the electrodes which occur in a predetermined frequency band. The filtered signal is coupled to an absolute value detector which produces a unidirectional output current signal the instantaneous amplitude of which corresponds to the instantaneous amplitude of the filter output signals. The detector output signal is coupled to a reversible microcoulometer which plates a metal from one electrode to another. The plating activity of the reversible microcoulometer produces a mass of plated material which is equivalent to the current-time integral, hence the average value, of the filter output signal. A readout device may be provided which causes the microcoulometer to operate in a reverse direction at a predetermined flow rate thereby causing a current of a predetermined value to flow. The value of the current-time integral may then be determined by determining the time required for the microcoulometer to operate in the reverse direction at the known current value. As an alternative, an event detection means may be provided which receives the signal from the electrodes and produces an output current signal of a known amplitude and duration or any signal producing a fixed, known charge for each occurrence of a predetermined wave form. In this mode of operation the reversible microcoulometer in effect operates as a counter with the amount of plating being equivalent to the number of occurrences of the predetermined wave form.

1 Claim, 7 Drawing Figures

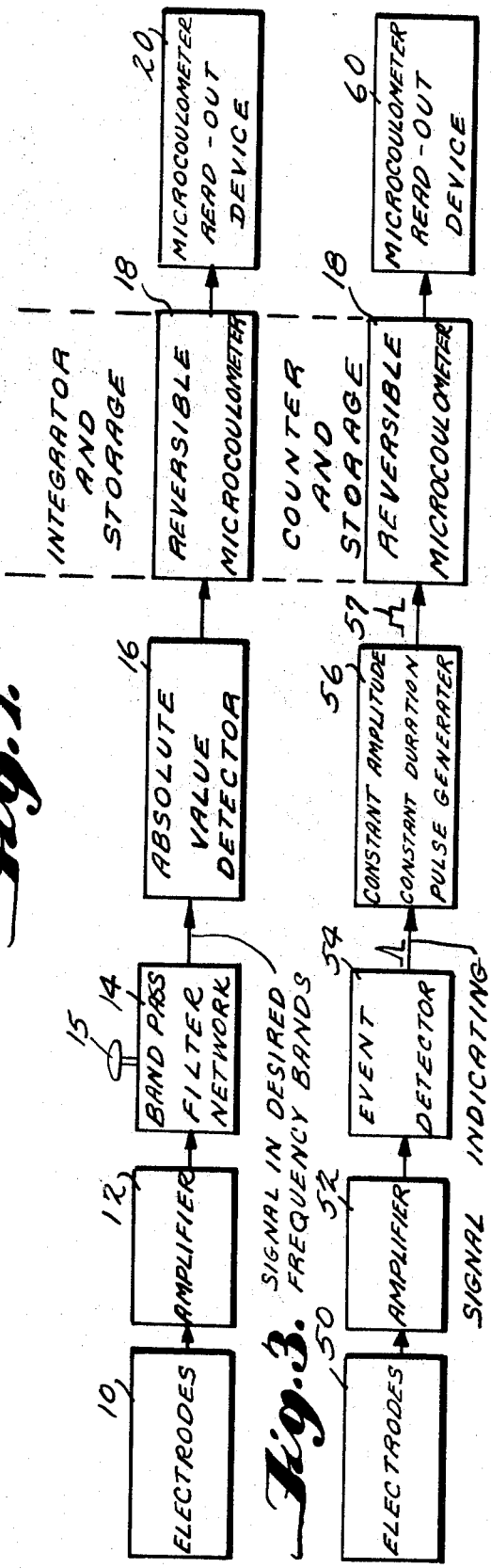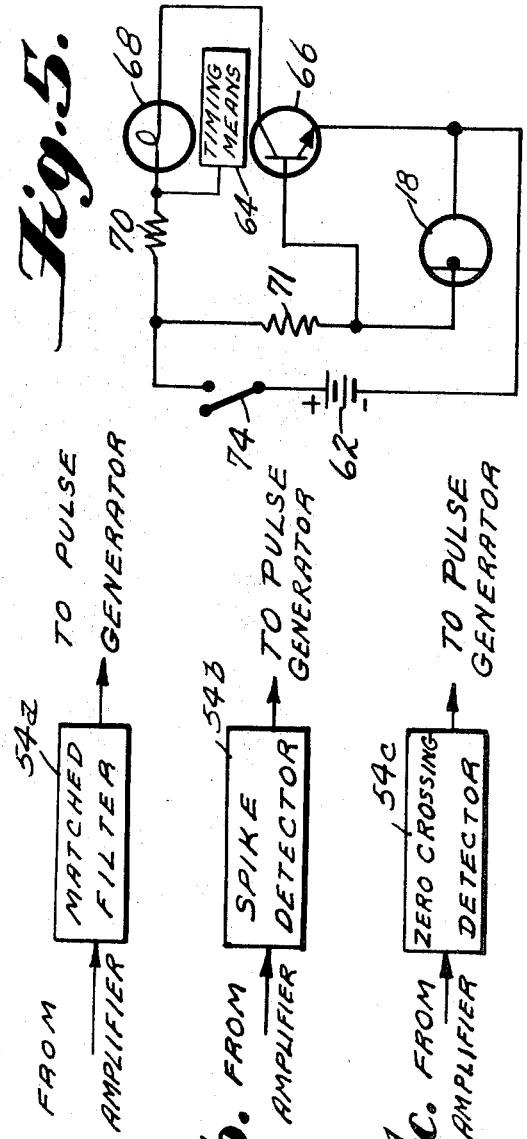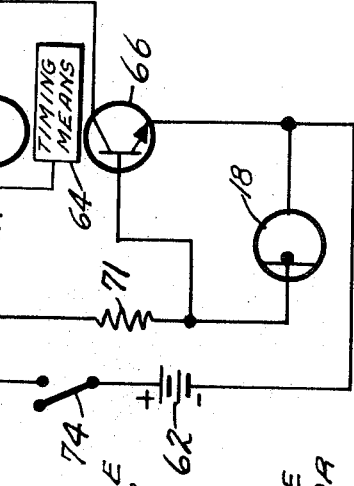

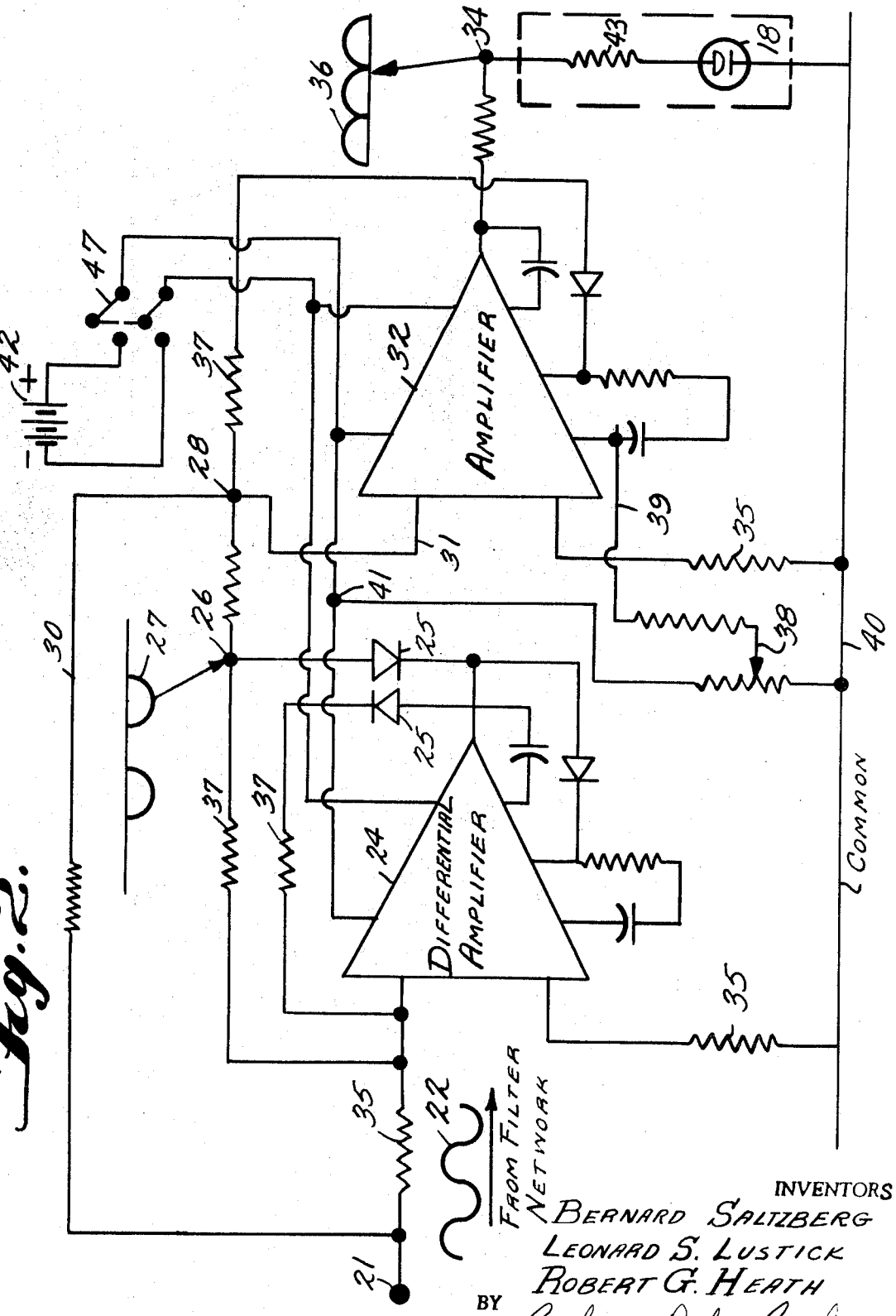

APPARATUS FOR DETECTING, ANALYZING AND RECORDING BIOELECTRIC POTENTIALS

This invention relates to apparatus for detecting analyzing and recording physiologically generated electrical signals, as for example, those generated by heart activity or those generated by the brain. The invention provides a means for the direct quantitative evaluation of electrophysiological activity.

Various devices are and have been available for monitoring electrophysiological activity, and principal among these are the well-known electrocardiograph and electroencephalograph. In the principal form the latter devices have taken, the patient is connected to a relatively bulky machine which monitors his electrophysiological activity, and the signals emanating from the body are continuously recorded on a continuous tape-like strip chart. In order for a diagnostic determination to be made from this readout it is necessary to analyze each portion of the entirety of what might be a very lengthy chart to determine the number of occurrences of a certain wave shape or to measure the amplitude of signal components in a prescribed frequency band. This task requires the services of skilled personnel capable of understanding the wave forms on the chart and capable of making the necessary mathematical calculations therefrom to arrive at the desired information. Further, such analyses will require long periods of time to complete because most data collection periods are of a time which will generate extremely lengthy charts, often hundreds of feet in length.

The more modern versions of these devices utilize magnetic recording tape, but in order for an analysis to be made of the data on the tape it must undergo analog to digital conversion followed by processing in a digital computer to derive the quantitative measures. Thus, while the time factor in such analyses has been reduced, the cost in most cases has been significantly increased. Further, it must be noted that physicians generally must still use the strip chart recorder described above because of this relatively high cost.

The presently available devices for recording electrophysiological activity are so bulky that the patient or test animal must remain in a relatively stationary position while the machine is in operation. For many purposes the data realized is of marginal usefulness in that it would be more desirable to determine the patient's or the test animal's responses to a given stimulus while undergoing normal daily activities. At present, no device is available which may be attached to the patient's body and which will record data for a reasonably long period of time while the patient is going through his normal daily routine or is undergoing his normal sleep cycle.

It is therefore an object of this invention to provide a means for detecting, analyzing and recording electrophysiological data which obviates the need for length chart analysis. That is, it is an object of this invention to provide a device which will actually record only those electrical occurrences which are of interest in observing a particular physical phenomenon thereby permitting diagnostic analysis in a relatively short period of time.

Another object of this invention is to provide a means for recording electrophysiological data which may be attached to the patient's or to an animal's body allowing normal activities to be undertaken and which will record such data over a relatively long period of time.

Another object of this invention is to provide a simple device that is suitable for obtaining direct quantitative measure of asymmetry in the electrophysiological activity of opposite brain hemispheres.

Another object of this invention is to provide a simple device that is suitable for obtaining a simple and direct quantitative measure of electrophysiological activity in various frequency bands by measuring the average amplitude of a fully rectified or half-wave rectified signal and, as made necessary by the parameters to be measured, measuring only those components occurring above a specified amplitude threshold value.

Still another object of this invention is to provide a means for selectively detecting certain prescribed wave shapes in an electrophysiological signal, to count these events over extended periods of time and to store indefinitely the counted result.

The foregoing and other objects may be attained by constructing measuring apparatus according to the principles of our invention, said apparatus essentially comprising electrodes or other means for receiving the physiologically generated electrical signal, and in the case where the power in a given frequency band is being measured, the received signal is passed through a band pass filter. The filtered signal may then be coupled to a detector means which provides a unidirectional current output signal equivalent to the filtered signal appearing at the detector input. The current output signal from the detector is coupled to an electrolytic cell which in effect integrates the signal over a period of time and converts the current-time integral to a mass integral. In many instances it will be desirable to measure only those components in the desired frequency band which exceed a predetermined amplitude level, and a threshold detector means may be provided for this purpose. The power measurement in the given frequency band may then be evaluated by simply causing the electrolytic cell to reverse plate. By causing the reverse plating operation to take place at a known current level, the time needed for this reverse plating operation need only be measured for one to arrive at the current-time integral. It is to be noted that by choosing a high current value for the reverse plating operation this measurement operation will require a relatively short period of time.

In those cases where it is desired to count the number of occurrences of a predetermined wave shape over a given period of time a detection means is provided, instead, which will respond only to the predetermined wave shape and produce an output signal only when such a wave shape occurs or only when it does not occur, as desired. The output signal from this detection means will then actuate a pulse generator which produces a pulse of known, fixed charge which is coupled to an electrolytic cell. In this mode of operation the cell in effect acts as a counter, and by measuring the time required for the electrolytic cell to reverse plate at a known current level, one can easily determine the number of constant amplitude, constant duration pulses which were originally coupled to the cell and thereby determine the number of occurrences of the predetermined wave form.

The invention may be best understood by reference to the description given hereinbelow and the accompanying drawings in which:

FIG. 1 is a block diagram of a first preferred embodiment constructed according to the principles of this invention for obtaining direct quantitative measures of electrophysiological activity in predetermined frequency band;

FIG. 2 is a schematic diagram of a preferred embodiment of a detector to be used in the FIG. 1 embodiment illustrating the wave forms at various points in the detector and the connection of the detector to an electrolytic cell;

FIG. 3 is a second preferred embodiment constructed according to the principles of this invention which measures the number of occurrences of an event, which event may be the occurrence of a prescribed wave shape;

FIGS. 4a, 4b and 4c are block diagrams of elements which may be used as an event detector according to the principles of this invention; and FIG. 5 is a schematic diagram illustrative of the type of device which may be used to obtain a readout from the electrolytic cell.

In the preferred embodiments constructed according to the principles of the invention the elements used for performing the integrating or counting operation and the storage operation are electrolytic cells which may be caused to plate in either of two directions and which will store the plated mass for an indefinite period of time. These devices are known also as reversible microcoulometers, and an example of such a device is the E-Cell manufactured by the Bissett-Berman Corporation of Los Angeles, California. The reversible microcoulometer used will operate at very low current levels, e.g. 1 microampere, and they have the capability of storing the results indefinitely. Generally, these devices have a center electrode which is surrounded by an electrolyte with the container serving as the second electrode.

In operation the reversible microcoulometer in effect converts the current-time integral of an electrical function into an equivalent mass integral. This result is brought about by the fact that exactly one atom is transferred from the plating electrode to the plate electrode for each electron coupled to the reversible microcoulometer. The result in ampere-seconds of silver or the like can be read out of the cell by reversing the polarity of the electrodes and determining the time required for reverse plating the cell with a constant current source operating at a current much higher than the charging current, e.g. 1 milliampere. When the plating electrode in the reverse plating operation is completely deplated, a large increase of impedance across the cell will take place, and this may be exploited to indicate when the cell is completely read out thereby allowing one to accurately determine the time required for the reverse plating operation. Thus, the result can be read out at the user's convenience in a very short time relative to the time required for the accumulation of the data on the cell. For example, if the charging current level is 10 microamperes and the charging period is 8 hours, the readout could be caused to occur at a discharge rate of 1 milliampere, and the time period required for the readout would be only less than 5 minutes.

In FIG. 1 a preferred embodiment constructed according to the principles of this invention is shown which measures electrophysiological activity in various predetermined frequency bands. The measure of activity made by this embodiment is the average amplitude of a fully rectified or half-wave rectified signal above a specified amplitude threshold value.

Electrodes 10 may be attached to the patient's body or to a test animal at any desired point and coupled to an amplifier 12, the gain and band pass of which will be dependent upon the particular parameters being measured. Amplifier 12 is of conventional design well known to those skilled in the art. The amplified signal is then passed through a band pass filter network 14, which may be adjustable (as shown by knob 15 in FIG. 1), to remove those frequency components which are not of interest. The band pass filter network, as well, may be of conventional design.

The filtered signal is coupled to an absolute value detector 16 the purpose of which is to convert the alternating voltage characterizing the filtered electrophysiological signal into a unidirectional or full wave rectified current signal. The unidirectional current signal from the detector 16 is then applied to the anode of reversible microcoulometer 18. The plating operation in microcoulometer 18 proceeds in direct proportion to the current-time integral of the unidirectional current, as described above. Thus, when the data-taking phase of the operation is completed a mass of silver or like plating material will have been plated on the cathode equivalent to the current-time integral, and this will bear a direct relationship to the power in the specified frequency band, as determined by filter network 14. Furthermore, absolute value detector 16 may contain a threshold detector, as well, making the plating activity of microcoulometer 18 equivalent to the power in s specified frequency band for those signal components therein exceeding a predetermined amplitude level.

Reference is now made to FIG. 2 of the drawings in which a more complete description of the absolute value detector is given. The signal received at input pin 21 of the detector from filter network 14 is of a periodic nature as shown diagrammatically at 22. This signal is coupled to a the inverting input of differential amplifier 24 which includes diodes 25 for performing inverted half-wave rectification. The half-wave rectified output signal 27 from amplifier 24 is shown as taken at output point 26.

At a summing point 28, a portion of the inverted half-wave rectified signal 27 is added to a portion of the original alternating input signal 22 which is coupled to point 28 by lead line 30. This added signal is coupled to the negative input terminal of a differential operational amplifier 32 over lead line 31, and (due to proper choice of the input resistors associated with the summing node 28 and the amplifier feedback resistor) this amplifier provides an output at pin 34 which is proportional to the negative of twice the amplitude of the inverted half-wave rectified signal 27 plus the negative of the amplitude of the input signal 22. The positive input terminal of amplifier 32 is connected to ground through resistor 35 as shown in FIG. 2. The output signal from amplifier 32 can be shown in a conventional manner to be equal to the full wave rectified signal shown diagrammatically at 36. In order to provide the latter result, it is only necessary to adjust input resistors and feedback resistors to proper valves as will be apparent to those in the art.

Threshold level detection is accomplished by a potentiometer 38 connected between a line 41, which in turn is connected through a switch 47 to the positive terminal of DC power source 42, and common lead line 40. The positive DC output from potentiometer 38 on line 39 adjusts the zero level of amplifier 32 as will be appreciated by those in the art thereby permitting the amplifier to pass only those portions of the signal which exceed the zero level set by the potentiometer.

The remainder of the components are necessary only to insure the stability of the amplifiers or to provide frequency compensation as necessary in the manner well known to those skilled in the art.

The output signal 36 at output pin 34 is coupled to the reversible microcoulometer 18 through a load resister 43 to commence the plating operation. The mass of the material plated as described above will be equivalent to the current-time integral of output signal 36.

In order to demonstrate the feasibility of a device constructed as above tests were carried out in which amplifier 12 was adjusted to have a gain of 5,000 with a band pass of from 0.5 to 70 Hz., and the absolute value detector 16 was constructed as described above with reference to FIG. 2. The above configuration was applied to a number of laboratory test situations on rhesus monkeys and the results amply demonstrate its utility and its reliability. Two examples of such experiments are given hereinbelow wherein data taken was in the 1-8 Hz. and 8-70 Hz. frequency bands with the activity in the total pass band of the filter network being observed as well.

EXPERIMENT I

A cobalt lesion was produced in the left hippocampal region of a monkey's brain. The purpose of the experiment was to demonstrate migration of the abnormal electroencephalographic signal from the primary focal area into secondary areas. The reversible microcoulometer 18 was charged for 5 minute periods from bipolar depth electrodes located in regions of interest in the brain. In accordance with the description given above the time to discharge or reverse plate the cell is a measure of the electrical activity in the specific area. The longer the required time to discharge the cell, the greater the activity or average amplitude in the area. Table 1 below shows the result of this test.

TABLE 1

| Region | Gain | Initial | 24 Hrs. Post | 48 Hrs. Post |
| --- | --- | --- | --- | --- |
| Temporal | 100 | 34.4 Sec. | 37.8 | 30.4 |
| Left Hippo | 10 | 49.6 | 56.6 | 49.4 |
| Right Hippo | 5 | 41.6 | 74.8 | 31.8 |
| Septum | 3 | 62.6 | 71.2 | 56.6 |
| Caudate | 2 | 28.0 | 32.0 | 23.8 |

The data given in Table 1 shows a large increase in the activity of the contralateral hippocampal region and significant change in the septum 24 hours after the time when the lesion was introduced. 48 hours later the right hippocampal region and septum are depressed, and the monkey died shortly thereafter.

EXPERIMENT II

The purpose of this experiment was to assay the effects of the drug taraxein on the brain. Table 2 below shows the effect of the drug in various subcortical regions after the first, second and third administration of the drug, respectively, as the base line reading for the monkey.

TABLE 2

| Region | Gain | Base-line | Post 1st Inj. 25 Min | Post 1st Inj. 35 Min | Post 2nd Inj. 25 Min | Post 2nd Inj. 35 Min | Post 3rd Inj. 25 Min | Post 3rd Inj. 35 Min |
|---|---|---|---|---|---|---|---|---|
| Ant Sept-Post Sept | 10 | 34.6 | 52.4 | | 61.0 | | 62.0 | |
| Post Sept-Caudate | 10 | 34.8 | | No Data | | 31.6 | | 34.4 |

The experimental results shown in the table indicate that the activity in the anterior region of the septum is greatly elevated after the administration of the drug taraxein. Other similar experimental situations involving administration of normal Saline with the same schedule as the taraxein administrations shown above do not indicate any increase in activity.

From the foregoing experimental results it can readily be seen that the device constructed according to the principles of this invention to measure average amplitude at given threshold levels in a specified frequency band yields reliable and accurate data or electrophysiological activity. While the results given above are with reference to laboratory experiments, it is contemplated that a device constructed according to the principles of this invention can be used, for example, in a doctor's office by unskilled personnel to detect abnormal asymmetries in the brain electrical activity between the hemispheres of the head. It could be used to monitor the effect of drugs and provide the needed information to determine the required drug administration schedule. In one of the more important applications a device constructed according to the principles of this invention can be used to detect the rare, abnormal electrophysiological event that occurs infrequently and thus would be missed without monitoring over extensive periods of time which this device makes entirely practical. Further, this invention makes possible the constant monitoring of post-surgical patients, and it would be useful in quantitatively classifying sleep stages by detecting EEG signal parameters which correlate with sleep.

Referring to FIG. 3 a second preferred embodiment of a device constructed according to the principles of this invention is shown. In this embodiment specialized electrical detection circuitry is used to selectively detect certain prescribed wave shapes in a signal, such as EEG or EKG signal, and to count these events over extended periods of time with the reversible microcoulometer.

In this embodiment electrodes 50 may be attached to the patient or test animal at the point where electrophysiological activity is to be monitored. The signal from electrode 50 is coupled to a conventional amplifier 52 which in turn feeds the amplified signal to an event detector 54. If the signal from electrode 50 is of the predetermined wave shape, the event detector 54 will produce an output signal, such as an impulse, which triggers a pulse generator 56.

When actuated, pulse generator 56 produces a constant amplitude, constant duration pulse 57 which is coupled to reversible microcoulometer 18. In this mode of operation the reversible microcoulometer 18 operates as a counter. That is, when each of the predetermined events occurs, a constant amount of current for a constant period of time causes a known amount of plating to occur in the microcoulometer. Therefore, when the readout device 60 is attached to reversible microcoulometer 18, and the time needed for the microcoulometer 18 to discharge at a known current is measured, the operator will be able to accurately determine the number of pulses which were generated and coupled to the reversible microcoulometer. Again, the discharge rate can be made to be much greater than the charging rate thereby saving time in the readout phase.

FIGS. 4a–4c illustrate various types of devices which may be used as an event detector 54. For example, when monitoring electrocardiographic signals, the detection circuitry used may be matched filter 54a designed to match the important characteristics of the patient's EKG pattern. Matched filter 54a would compare the reference pattern, i.e., the filter pattern, with the patient's ongoing EKG and produce a standard output to be recorded in reversible microcoulometer 18 in the above described manner wherever the patient's EKG pattern evidenced characteristics which were significantly deviant from the referenced patterns built into the filter.

In an alternate mode of operation using matched filter 54a the matched filter could be designed to represent an EKG pattern corresponding to that of a known heart abnormality, and the reversible microcoulometer 18 would then record each occurrence in the ongoing EKG of any such abnormality. In this case a standard output would be recorded in the reversible microcoulometer when the ongoing EKG pattern characteristics were highly correlated with the characteristics of the abnormal reference pattern built into the matched filters 54a in the event detection device.

As an alternative event detector filter 54 may include a spike detector 54b which may be utilized to count the number of rapid eye movements during a night of sleep or to detect and count pathological spiking activity in an electroencephalographic pattern.

As a further alternative, a zero crossing detector 54c may be built into event detector 54 to analyze the spectral statistics of the electrophysiological activity being monitored.

Zero crossing detection circuitry is well known to those skilled in the art. In addition, the utility of zero crossing statistics in medical applications is well established in the literature. The zero crossing events detected and accumulated in the embodiment herein being considered are as follows:

The time intervals between (1) zero crossings of wave form that fall in specified time windows, (2) zero crossings of the first derivative of the signal (maxima and minima points) that fall in specified time windows, and (3) zero crossings of the second derivative of the signal (points where the slope is maximum or minimum) that fall in specified time windows.

When the device is used in this mode it has particular application to the classification of EEG in analysis of sleep in assessing the effect of drugs and other procedures which alter the EEG. The zero cross detection mode can also be used for the measurement and accumulation of time intervals corresponding to important parameters or events of the EKG and therefore would have important applications for EKG monitoring.

FIG. 5 illustrates a typical embodiment of a device used to readout the reversible microcoulometer. In this embodiment the reversible microcoulometer 18 is placed across the base-emitter junction of a NPN transistor 66. The base-collector circuit of the transistor comprises the series combination of load resistors 70 and 71 and a lamp 68. A DC power source 62 is connected in a parallel relationship to the transistor across the emitter and collector, and a switch 74 in series with the source 62 is provided to activate the readout device.

When the reversible microcoulometer has completed its anode to cathode plating operation, it may be connected to the readout device as shown. Upon the closing of switch 74, a reverse plating operation from cathode to anode will commence, and after the reverse plating operation is completed, the impedance across the microcoulometer 18 will increase abruptly. Upon the latter abrupt increase in impedance across microcoulometer 18, the base voltage of transistor 66 will rise sufficiently to allow current to be conducted through the transistor to light lamp 68. The time required to read out the microcoulometer 64 may then be noted on a stop watch or the like, and the amount of electrophysiological activity causing forward plating of the microcoulometer may then readily be determined. Other readout devices are commercially available which include a constant current source for reverse plating and a digital timer to record the readout time (such as timing means 64 shown in FIG. 5).

It can be seen from the foregoing description that the device constructed according to the principles of our invention provides a novel and simple means for analyzing complex electrophysiological signals. The ability to compress the record into a set of desirable descriptors on which clinical decisions can be based obviates the need for skilled personnel to spend many tedious hours analyzing a lengthy chart or the need for costly and complex electronic data processing equipment to analyze electrical data on a magnetic tape. Furthermore, our device provides a novel means for monitoring over relatively long periods of time the electrophysiological activity occurring while the patient is performing normal daily tasks or while he is sleeping as usual at home and indefinitely storing the data recorded.

The foregoing descriptions of preferred embodiments constructed according to the principles of our invention and the description of their application are not exhaustive and are only exemplary. It is contemplated that those skilled in the art may modify the elements of their arrangement within the scope of the appended claims.

We claim:

1. Apparatus for obtaining a quantitative measure of electrophysiological activity in a predetermined frequency band comprising means for receiving a physiologically generated electrical signal, filter means electrically connected to said means for receiving to provide a filtered output signal which consists of only those frequency components of said received signal occurring within a predetermined band of frequencies, detector means electrically connected to said filter means for receiving said filtered output signal and for producing a unidirectional electrical current output signal, the instantaneous amplitude of said output current signal being proportional to the instantaneous amplitude of said filtered output signal, said detector means comprising a rectifier means for accomplishing half wave rectification of said filter output signal, summing means for adding said half wave rectified signal to said filter output signal and means for producing from said added signal a current signal having an amplitude equal to the negative of twice the amplitude of said half wave rectified signal plus the negative of the amplitude of said filter output signal, and integrating means electrically connected to said detector means for receiving said output current signal and generating a quantum equivalent to the time integral of said detector output current signal and for indefinitely storing said quantum.

* * * * *